United States Patent
Yun et al.

(10) Patent No.: US 11,757,683 B2
(45) Date of Patent: Sep. 12, 2023

(54) RECEIVER FOR RECEIVING MULTILEVEL SIGNAL

(71) Applicants: SK hynix Inc., Icheon (KR); Seoul National University R&DB Foundation, Seoul (KR)

(72) Inventors: Daeho Yun, Seongnam (KR); Deog-Kyoon Jeong, Seoul (KR)

(73) Assignees: SK hynix Inc., Icheon (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 17/698,918

(22) Filed: Mar. 18, 2022

(65) Prior Publication Data
US 2023/0164007 A1 May 25, 2023

(30) Foreign Application Priority Data
Nov. 19, 2021 (KR) .................. 10-2021-0160802

(51) Int. Cl.
*H04L 25/03* (2006.01)
*H04L 27/01* (2006.01)

(52) U.S. Cl.
CPC .. *H04L 25/03885* (2013.01); *H04L 25/03057* (2013.01); *H04L 27/01* (2013.01)

(58) Field of Classification Search
CPC ......... H04L 25/03006; H04L 25/03057; H04L 25/03076; H04L 25/03885; H04L 2025/03433
USPC ................. 375/229, 232, 233, 348–350, 353; 708/322, 323
See application file for complete search history.

(56) References Cited

U.S. PATENT DOCUMENTS

| | | | | |
|---|---|---|---|---|
| 5,036,296 A * | 7/1991 | Yoshida | .............. | H04L 27/2273 331/23 |
| 9,397,868 B1 * | 7/2016 | Hossain | ................ | H04L 7/0087 |
| 10,873,484 B2 | 12/2020 | Chen | | |
| 11,228,470 B2 * | 1/2022 | Delshadpour | ....... | H03F 3/45098 |
| 2016/0301548 A1 * | 10/2016 | Musah | .............. | H04L 25/03057 |
| 2020/0119901 A1 * | 4/2020 | Hormati | ................ | H04L 7/0012 |
| 2020/0313638 A1 | 10/2020 | Hong et al. | | |
| 2022/0070033 A1 * | 3/2022 | Go | ...................... | H04L 25/0272 |

OTHER PUBLICATIONS

T. M. Hollis et al., "An 8Gb GDDR6X DRAM Achieving 22Gb/s/pin with Single-Ended PAM4 Signaling," ISSCC, pp. 348-350, Feb. 2021.
Young-Ju Kim et al., "A 16Gb 18Gb/S/pin GDDR6 DRAM with per-bit trainable single-ended DFE and PLL-less clocking," ISSCC, pp. 204-206, Feb. 2018.
J. L. Zerbe et al., "Equalization and Clock Recovery for a 2.5-10-GB/s 2-PAM/4-PAM Backplane Transceiver Cell," IEEE JSSC, vol. 38, pp. 2121-2130, Dec. 2003.
GDDR6 SGRAM Specification (JESD250C), JEDEC Standard, JEDEC solid state technology association, Feb. 2021.

* cited by examiner

*Primary Examiner* — Young T. Tse

(57) ABSTRACT

A receiver includes a plurality of linear equalizers receiving an input signal; and a plurality of samplers configured to sample a plurality of equalization signals output from the plurality of linear equalizers according to a clock signal. Each of the plurality of linear equalizers compares the input signal with a reference voltage among a plurality of reference voltages to determine a level of the input signal.

11 Claims, 5 Drawing Sheets

RECEIVER FOR RECEIVING MULTILEVEL SIGNAL

CROSS-REFERENCE TO RELATED APPLICATION

The present application claims priority under 35 U.S.C. § 119(a) to Korean Patent Application No. 10-2021-0160802, filed on Nov. 19, 2021, which is incorporated herein by reference in its entirety.

BACKGROUND

1. Technical Field

Various embodiments generally relate to a receiver for receiving a multilevel signal, and more particularly, to a receiver capable of minimizing an offset of a sampler.

2. Related Art

FIG. 1 is a block diagram showing a conventional receiver 1 for receiving a Pulse Amplitude Modulation 4-level (PAM4) signal.

The conventional receiver 1 includes a linear equalizer 10, a first sampler 21, a second sampler 22, and a third sampler 23.

The linear equalizer 10 receives an input signal IN, performs an equalization operation, and outputs an equalization signal OUT.

The first sampler 21 compares the equalization signal OUT with a first reference voltage VREFH and samples a result thereof to generate the first signal OUTH.

The second sampler 22 compares the equalization signal OUT with a second reference voltage VREFM and samples a result thereof to generate a second signal OUTM. The second reference voltage VREFM is smaller than the first reference voltage VREFH.

The third sampler 23 compares the equalization signal OUT with a third reference voltage VREFL and samples a result thereof to generate a third signal OUTL. The third reference voltage VREFL is smaller than the second reference voltage VREFM.

The first to third reference voltages VREFH, VREFM, and VREFL are used to distinguish four levels of the PAM4 signal.

For example, the first reference voltage VREFH distinguishes a fourth level from a third level, the second reference voltage VREFM distinguishes the third level from a second level, and the third reference voltage VREFL distinguishes the second level from a first level.

Each of the first, second, and third samplers 21, 22, and 23 includes input transistors for receiving differential signals.

In general, an input offset exists in the input transistors due to threshold voltage mismatch or beta mismatch.

An error may occur when the sampler determines a level due to the input offset, and accordingly, bit error rate (BER) may increase.

As shown in FIG. 1, the conventional receiver 1 includes the linear equalizer 10 and a plurality of samplers 21, 22, and 23, and an input offset exists in each of the plurality of samplers 21, 22, and 23. Accordingly, the bit error rate may be further increased.

SUMMARY

In accordance with an embodiment of the present disclosure, a receiver may include a plurality of linear equalizers receiving an input signal; and a plurality of samplers configured to sample a plurality of equalization signals output from the plurality of linear equalizers according to a clock signal. Each of the plurality of linear equalizers compares the input signal with a reference voltage among a plurality of reference voltages to determine a level of the input signal.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and beneficial aspects of those embodiments.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to the presented embodiments within the scope of teachings of the present disclosure. The detailed description is not meant to limit embodiments of this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

Figure 2:
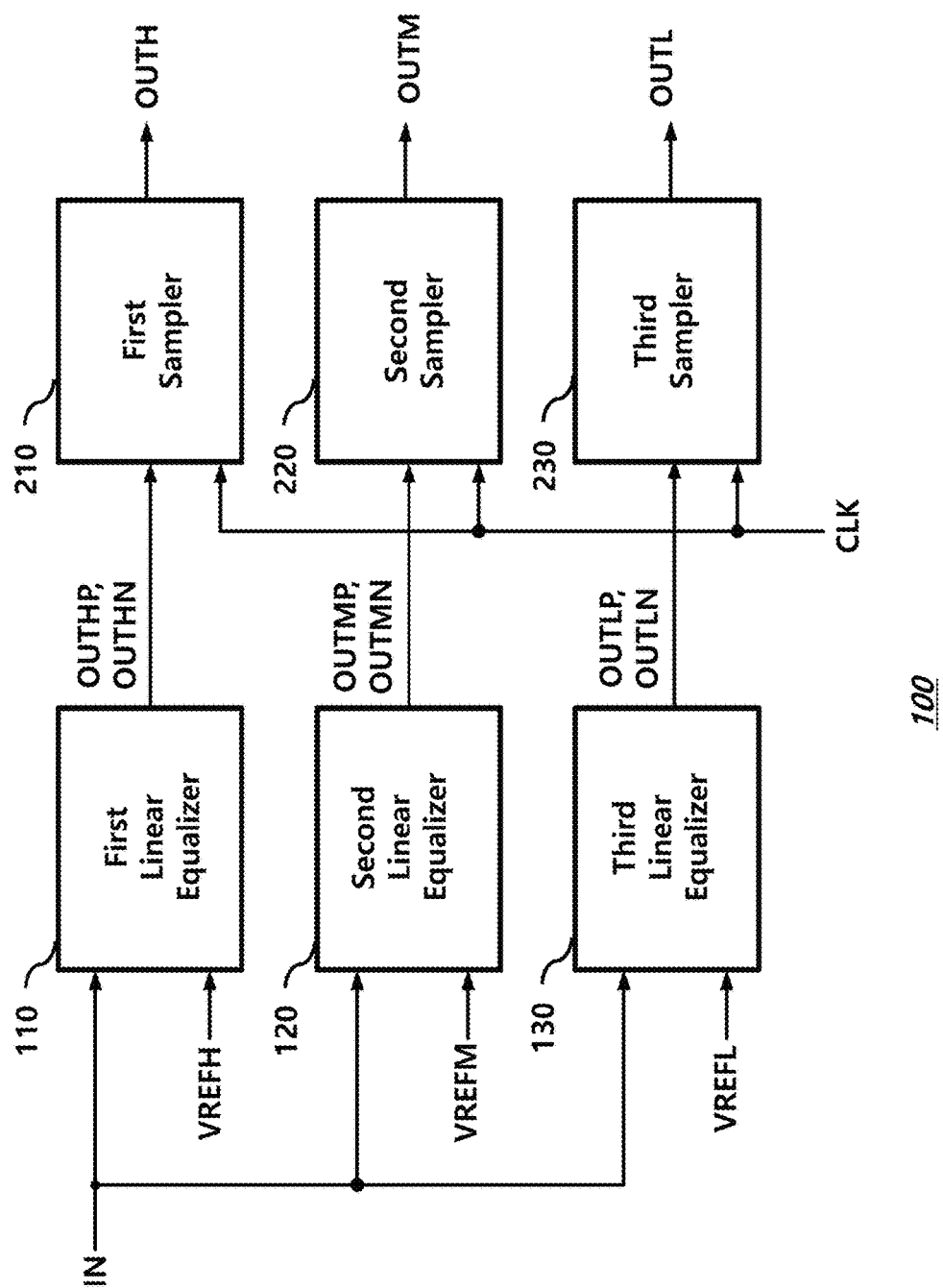
FIG. 2 illustrates a receiver according to an embodiment of the present disclosure.

FIG. 2 illustrates a receiver 100 receiving a multilevel signal (e.g., a PAM4 signal) according to an embodiment of the present disclosure.

The receiver 100 includes a first linear equalizer 110, a second linear equalizer 120, a third linear equalizer 130, a first sampler 210, a second sampler 220, and a third sampler 230.

The first linear equalizer 110 compares an input signal IN with a first reference signal (e.g., a first reference voltage) VREFH, performs an equalization operation, and outputs first equalization signals OUTHP and OUTHN. The first equalization signals OUTHP and OUTHN are differential signals.

The first sampler 210 samples the first equalization signals OUTHP and OUTHN according to a clock signal CLK and outputs a first signal OUTH.

The second linear equalizer 120 compares the input signal IN with a second reference signal (e.g., a second reference voltage) VREFM, performs an equalization operation, and outputs second equalization signals OUTMP and OUTMN. The second equalization signals OUTMP and OUTMN are differential signals. The second reference voltage VREFM is smaller than the first reference voltage VREFH.

The second sampler 220 samples the second equalization signals OUTMP and OUTMN according to the clock signal CLK and outputs a second signal OUTM.

The third linear equalizer 130 compares the input signal IN with a third reference signal (e.g., a third reference voltage) VREFL, performs an equalization operation, and outputs third equalization signals OUTLP and OUTLN. The third equalization signals OUTLP and OUTLN are differential signals. The third reference voltage VREFL is smaller than the second reference voltage VREFM.

The third sampler 230 samples the third equalization signals OUTLP and OUTLN according to the clock signal CLK and outputs a third signal OUTL.

The first to third reference voltages VREFH, VREFM, and VREFL are used to distinguish first to fourth levels of the PAM4 signal.

For example, the first reference voltage VREFH distinguishes the fourth level from the third level, the second reference voltage VREFM distinguishes the third level from the second level, and the third reference voltage VREFL distinguishes the second level from the first level.

Figure 3:
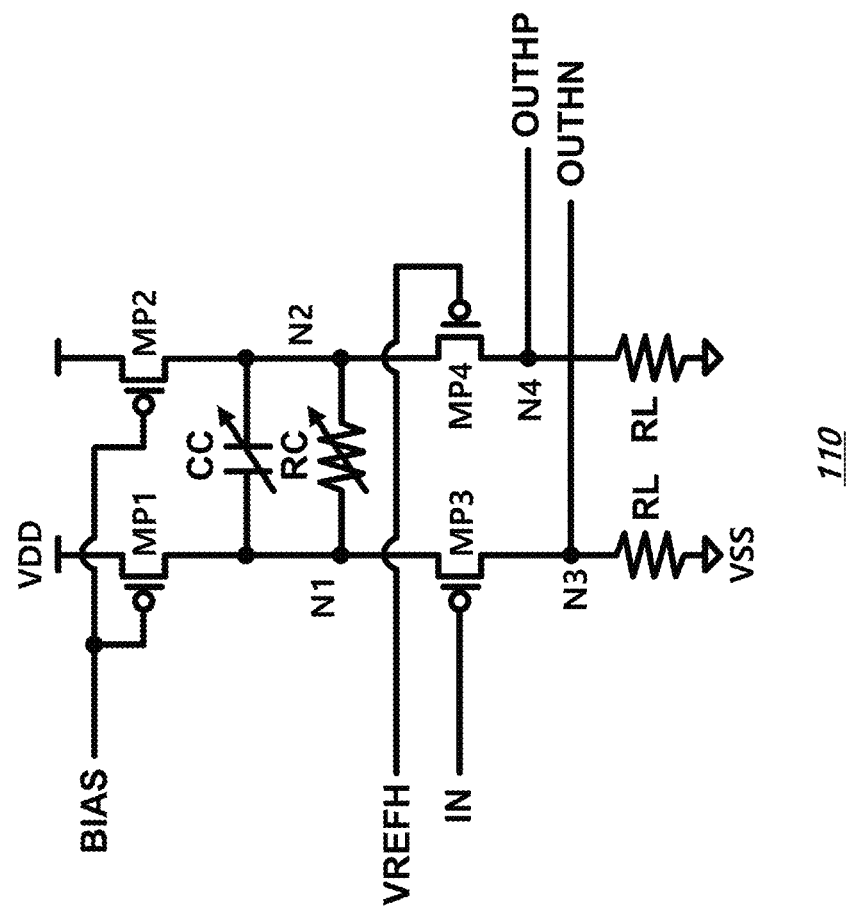
FIG. 3 illustrates a first linear equalizer according to an embodiment of the present disclosure.

FIG. 3 is a circuit diagram illustrating the first linear equalizer 110 of FIG. 2 according to an embodiment.

The first linear equalizer 110 includes a first transistor (e.g., a first PMOS transistor) MP1 having a first terminal (e.g., a source) and a second terminal (e.g., a drain) coupled between a first power source VDD and a first node N1, and a second transistor (e.g., a second PMOS transistor) MP2 having a first terminal (e.g., a source) and a second terminal (e.g., a drain) coupled between the first power source VDD and a second node N2.

A bias signal BIAS is provided to control terminals (e.g., the gates) of the first PMOS transistor MP1 and the second PMOS transistor MP2.

The bias signal BIAS may be provided as a substantially fixed value after an optimal operating condition is found.

The first linear equalizer 110 includes a variable capacitor CC and a variable resistor RC coupled between the first node N1 and the second node N2. For example, the variable capacitor CC and the variable resistor RC may be coupled in parallel between the first node N1 and the second node N2.

The variable capacitor CC and the variable resistor RC may be adjusted according to a Nyquist frequency and an amplification ratio.

The first linear equalizer 110 includes a third transistor (e.g., a third PMOS transistor) MP3 having a first terminal (e.g., a source) and a second terminal (e.g., a drain) coupled between the first node N1 and a third node N3 and a fourth transistor (e.g., a fourth PMOS transistor) MP4 having a first terminal (e.g., a source) and a second terminal (e.g., a drain) coupled between the second node N2 and the fourth node N4.

The input signal IN is provided to a control terminal (e.g., a gate) of the third PMOS transistor MP3, and the first reference voltage VREFH is provided to a control terminal (e.g., a gate) of the fourth PMOS transistor MP4.

The first linear equalizer 110 includes load resistors RL coupled between the third node N3 and a second power source VSS and between the fourth node N4 and the second power source VSS.

The third node N3 outputs a second differential equalization signal (e.g., a negative equalization signal) OUTHN, and the fourth node N4 outputs a first differential equalization signal (e.g., a positive equalization signal) OUTHP.

The first linear equalizer 110 performs an equalization operation for amplifying signal attenuation in the Nyquist frequency region of a channel. For example, the first linear equalizer 110 may perform an equalization operation for attenuating low-frequency signal components and amplifying components in the Nyquist frequency region of a signal transmitted through a channel.

Unlike the conventional linear equalizer that receives only the input signal IN, the first linear equalizer 110 of this embodiment compares and amplifies the input signal IN and the first reference voltage VREFH.

For example, when the input signal IN is greater than the first reference voltage VREFH, the first differential equalization signal OUTHP has a voltage greater than that of the second differential equalization signal OUTHN, and when the input signal IN is smaller than the first reference voltage VREFH, the first differential equalization signal OUTHP has a voltage smaller than that of the second differential equalization signal OUTHN.

The configuration and operation method of the second linear equalizer 120 and the third linear equalizer 130 are substantially the same as those of the first linear equalizer 110 except signals used therein. Accordingly, detailed descriptions of the configurations and operation methods of the second and third linear equalizers 120 and 130 may be omitted for the interest of brevity.

Figure 4:
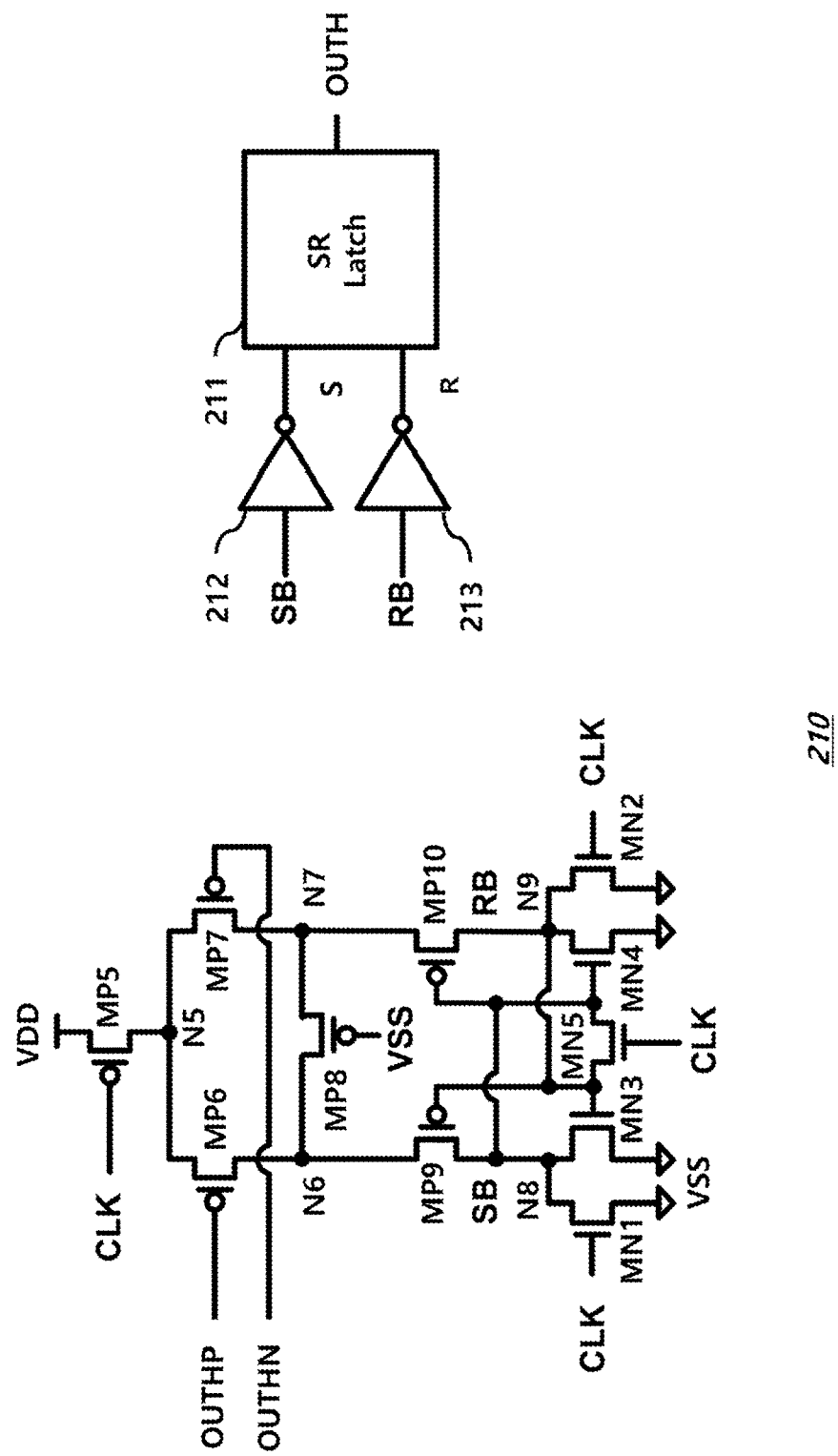
FIG. 4 illustrates a first sampler according to an embodiment of the present disclosure.

FIG. 4 is a circuit diagram illustrating the first sampler 210 of FIG. 2 according to an embodiment of the present disclosure.

The first sampler 210 includes a fifth transistor (e.g., a fifth PMOS transistor) MP5 having a first terminal (e.g., a source) and a second terminal (e.g., a drain) coupled between the first power source VDD and a fifth node N5 and a control terminal (e.g., a gate) to which a clock signal CLK is applied.

The first sampler 210 includes a sixth transistor (e.g., a sixth PMOS transistor) MP6 having a first terminal (e.g., a source) and a second terminal (e.g., a drain) coupled between the fifth node N5 and a sixth node N6 and a control terminal (e.g., a gate) to which a first differential equalization signal (e.g., a positive first equalization signal) OUTHP is applied, and a seventh transistor (e.g., a seventh PMOS transistor) MP7 having a first terminal (e.g., a source) and a second terminal (e.g., a drain) coupled between the fifth node N5 and a seventh node N7 and a control terminal (e.g., a gate) to which a second differential equalization signal (e.g., a negative first equalization signal) OUTHN is applied.

The first sampler 210 includes an eighth transistor (e.g., an eighth PMOS transistor) MP8 having a first terminal (e.g., a source) and a second terminal (e.g., a drain) coupled between the sixth node N6 and the seventh node N7 and a control terminal (e.g., a gate) to which the second power voltage VSS is applied.

The eighth PMOS transistor MP8 provides a virtual ground in the process of comparing and amplifying the positive first equalization signal OUTHP and the negative first equalization signal OUTHN by the operation of a latch and improves an amplification characteristics of the latch.

The first sampler 210 includes a ninth transistor (e.g., a ninth PMOS transistor) MP9 having a first terminal (e.g., a source) and a second terminal (e.g., a drain) coupled between the sixth node N6 and an eighth node N8 and a control terminal (e.g., a gate) coupled to a ninth node N9 and a tenth transistor (e.g., a tenth PMOS transistor) MP10 having a first terminal (e.g., a source) and a second terminal (e.g., a drain) coupled between the seventh node N7 and the ninth node N9 and a control terminal (e.g., a gate) coupled with the eighth node N8.

The first sampler 210 includes an eleventh transistor (e.g., a first NMOS transistor) MN1 having a first terminal (e.g., a source) and a second terminal (e.g., a drain) coupled between the eighth node N8 and the second power source VSS and a control terminal (e.g., a gate) to which a clock signal CLK is applied and a twelfth transistor (e.g., a second NMOS transistor) MN2 having a first terminal (e.g., a source) and a second terminal (e.g., a drain) coupled between the ninth node N9 and the second power source VSS and a control terminal (e.g., a gate) to which a clock signal CLK is applied.

The first sampler 210 includes a thirteenth transistor (e.g., a third NMOS transistor) MN3 having a first terminal (e.g., a source) and a second terminal (e.g., a drain) coupled between the eighth node N8 and the second power source VSS and a control terminal (e.g., a gate) coupled to the ninth node N9, a fourteenth transistor (e.g., a fourth NMOS transistor) MN4 having a first terminal (e.g., a source) and a second terminal (e.g., a drain) coupled between the ninth node N9 and the second power source VSS and a control terminal (e.g., a gate) coupled to the eighth node N8, and a fifteenth transistor (e.g., a fifth NMOS transistor) MN5 having a first terminal (e.g., a source) and a second terminal (e.g., a drain) coupled between the eight node N8 and the ninth node N9 and a control terminal (e.g., a gate) to which a clock signal CLK is applied.

The first sampler 210 includes an SR latch 211 that outputs the first signal OUTH according to a set signal S and a reset signal R.

The first sampler 210 includes an inverter 212 for inverting a voltage SB of the eighth node N8 to generate the set signal S, and an inverter 213 for inverting a voltage RB of the ninth node N9 to generate the reset signal R.

When the clock signal CLK is at a high level, the voltages SB and RB of the eighth node N8 and the ninth node N9 are precharged to a first value (e.g., a low level).

At this time, both the set signal S and the reset signal R are at a second value (e.g., the high level), and the first signal OUTH maintains an existing value by the operation of the SR latch 211.

When the clock signal CLK is at the low level, the voltages SB and RB of the eighth node N8 and the ninth node N9 are amplified differentially according to a voltage difference between the positive first equalization signal OUTHP and the negative first equalization signal OUTHN.

For example, when the positive first equalization signal OUTHP is greater than the negative first equalization signal OUTHN, the voltage of the sixth node N6 becomes greater than the voltage of the seventh node N7, and the voltage SB of the eighth node N8 is amplified to the low level and the voltage RB of the ninth node N9 is amplified to the high level.

Accordingly, the set signal S becomes the high level, the reset signal R becomes the low level, and the first signal OUTH becomes the high level.

Conversely, when the positive first equalization signal OUTHP is smaller than the negative first equalization signal OUTHN, the voltage of the seventh node N7 becomes greater than the voltage of the sixth node N6, and the voltage of the seventh node N7 becomes higher than that of the sixth node N6, and the voltage SB of the node N8 is amplified to the high level and the voltage RB of the ninth node N9 is amplified to the low level by the latch operation.

Accordingly, the set signal S becomes the low level, the reset signal R becomes the high level, and the first signal OUTH becomes the low level.

The first sampler 210 may have an offset in the input transistors. However, the input offset of the first sampler 210 is reduced in inverse proportion to the amplification ratio of the first linear equalizer 110 of FIG. 3.

Accordingly, the first sampler 210 does not require a separate circuit for compensating for the input offset.

Figure 1:
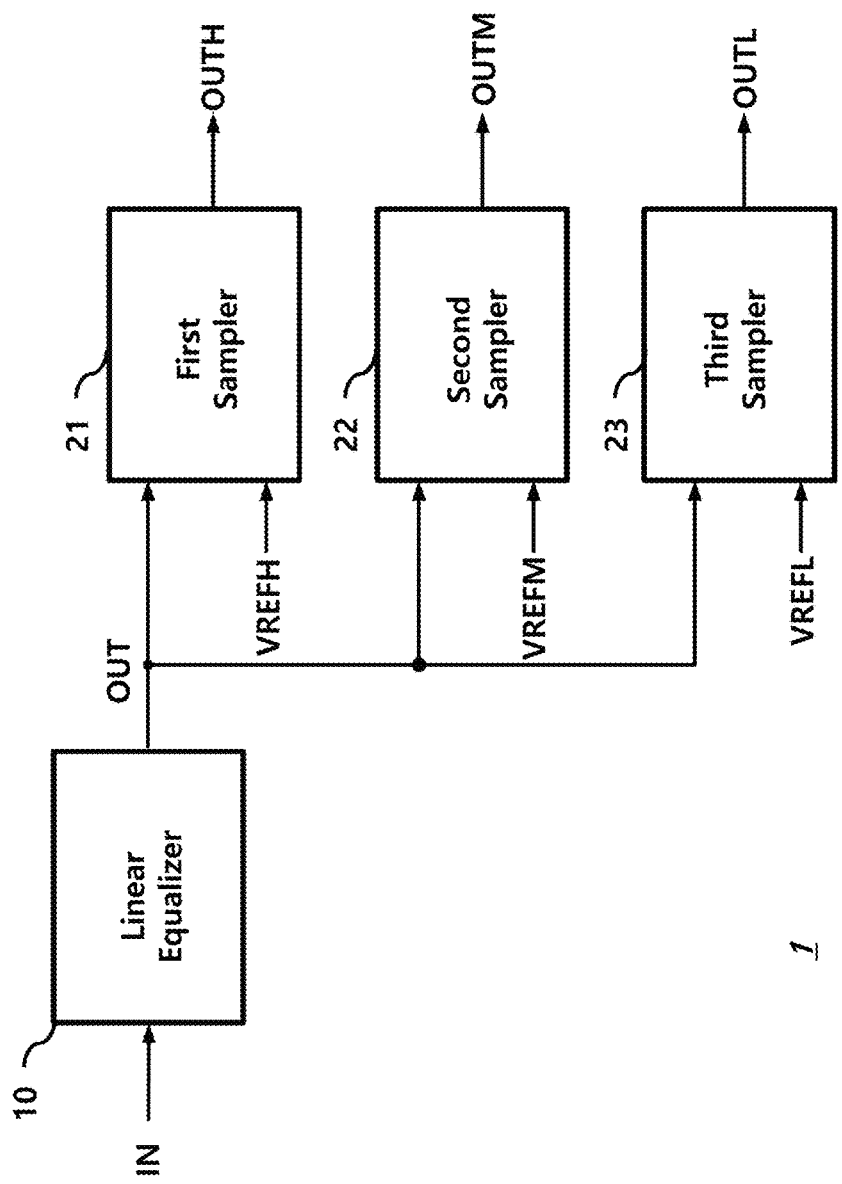
FIG. 1 illustrates a conventional receiver.

Since the second sampler 220 and the third sampler 230 differ only in signals and have substantially the same structure as the first sampler 210, descriptions of the configurations and operation methods of the second and third linear samplers 220 and 230 will be omitted for the interest of brevity. As described above, the first, second, and third liner equalizers 110, 120, and 130 are coupled to the first, second, and third samplers 210, 220, and 230, respectively. Each of the first, second, and third linear equalizers 110, 120, and 130 may provide a pair of differential equalization signals with a given amplification ratio to each of the first, second, and third samplers 210, 220, and 230, and the input offset of each of the first, second, and third samplers 210, 220, and 230 may be in inverse proportion to the amplification ratio. As a result, a receiver (e.g., the receiver 100 in FIG. 2) according to an embodiment of the present disclosure including the first, second, and third linear equalizers 110, 120, and 130 respectively coupled to the first, second, and third samplers 210, 220, and 230 may have a reduced input offset compared to that of a conventional receiver (e.g., the receiver 1 in FIG. 1).

Figure 5:
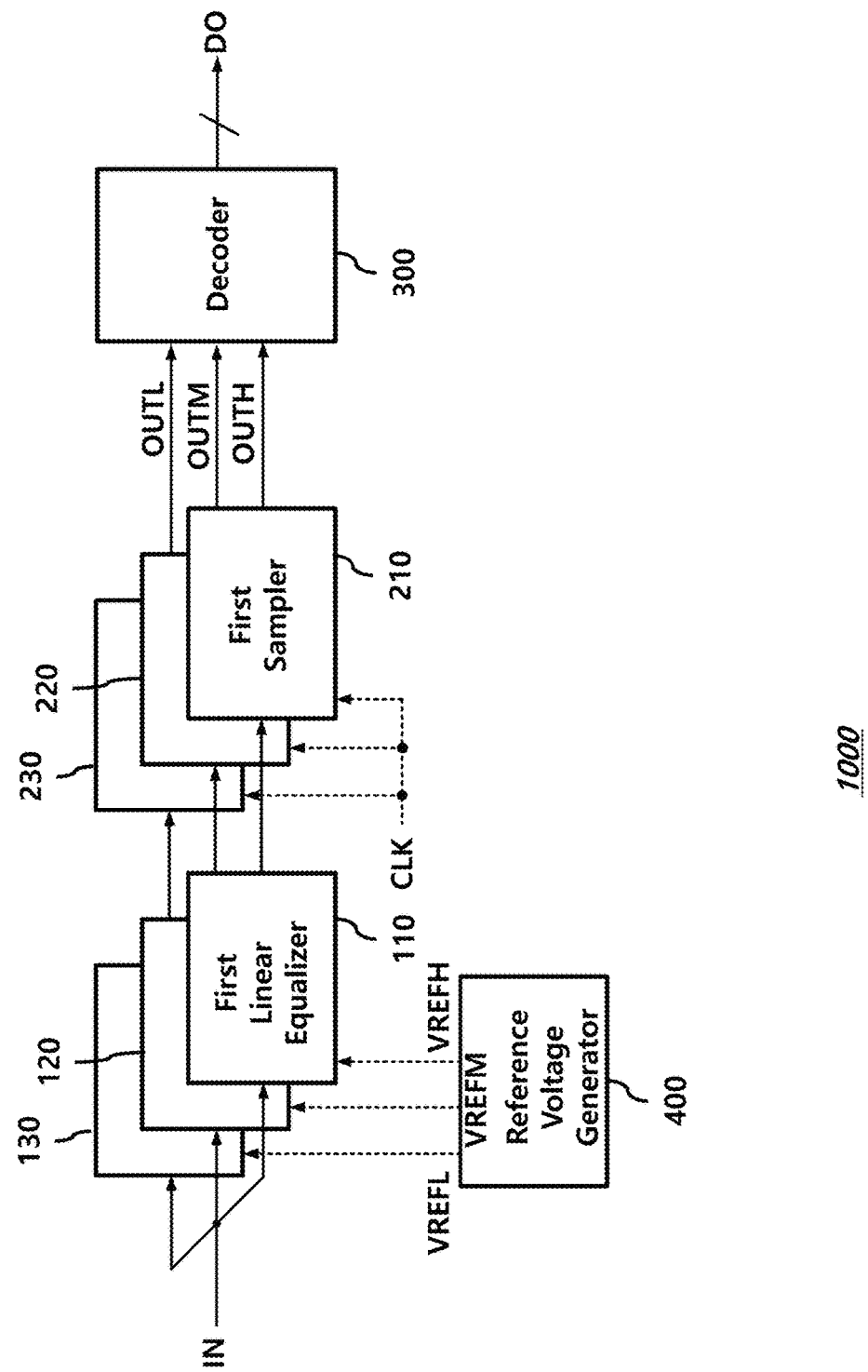
FIG. 5 illustrates a receiver according to an embodiment of the present disclosure.

FIG. 5 is a block diagram illustrating a receiver 1000 according to an embodiment of the present disclosure.

The receiver 1000 includes a decoder 300 that generates a data signal DO corresponding to the multilevel input signal IN by decoding the outputs (or output signals) OUTL, OUTM, and OUTH of the first, second, and third samplers 210, 220, and 230.

Since generating the data signal DO from the first signal OUTH, the second signal OUTM, and the third signal OUTL may be known in the art, a detailed configuration and operation of the decoder 300 will be omitted for the interest of brevity.

The receiver 1000 may further includes a reference voltage generator 400 that generates the first reference voltage VREFH, the second reference voltage VREFM, and the third reference voltage VREFL being provided to the first linear equalizer 110, the second linear equalizer 120 and the third linear equalizer 130, respectively.

Although various embodiments have been illustrated and described, various changes and modifications may be made to the described embodiments without departing from the spirit and scope of the invention as defined by the following claims.

What is claimed is:

1. A receiver comprising:
   a plurality of linear equalizers receiving an input signal; and
   a plurality of samplers configured to sample a plurality of equalization signals output from the plurality of linear equalizers according to a clock signal,
   wherein each of the plurality of linear equalizers compares the input signal with a reference voltage among a plurality of reference voltages to determine a level of the input signal,
   wherein each of the plurality of linear equalizers generates a pair of differential equalization signals corresponding to a comparison result between the input signal and the reference voltage among the plurality of reference voltages, and
   wherein each of the plurality of samplers generates a set signal and a reset signal corresponding to the pair of differential equalization signals, latches the set signal and the reset signal, and generates an output signal corresponding to the pair of differential equalization signals.

2. The receiver of claim 1, further comprising a decoder configured to generate a data signal corresponding to the input signal from a plurality of output signals of the plurality of samplers.

3. The receiver of claim 1, further comprising a reference voltage generator configured to generate the plurality of reference voltages.

4. The receiver of claim 1, wherein the plurality of linear equalizers are coupled to the plurality of samplers, respectively.

5. The receiver of claim 1, wherein the input signal is a multilevel signal.

6. The receiver of claim 5, wherein the multilevel signal is a Pulse Amplitude Modulation 4-level (PAM4) signal.

7. A receiver comprising:
a plurality of linear equalizers receiving an input signal; and
a plurality of samplers configured to sample a plurality of equalization signals output from the plurality of linear equalizers according to a clock signal,
wherein each of the plurality of linear equalizers compares the input signal with a reference voltage among a plurality of reference voltages to determine a level of the input signal,
wherein each of the plurality of linear equalizers includes:
a first transistor having a first terminal coupled to a first power source, a second terminal coupled to a first node, and a control terminal receiving a bias signal;
a second transistor having a first terminal coupled to the first power source, a second terminal coupled to a second node, and a control terminal receiving the bias signal;
a third transistor having a first terminal coupled to the first node, a second terminal coupled to a third node, and a control terminal receiving the input signal; and
a fourth transistor having a first terminal coupled to the second node, a second terminal coupled to a fourth node, and a control terminal receiving the reference voltage among the plurality of reference voltages,
wherein the fourth node outputs a first differential equalization signal, and the third node outputs a second differential equalization signal.

8. The receiver of claim 7, wherein each of the plurality of linear equalizers further includes:
a variable capacitor coupled between the first node and the second node;
a variable resistor coupled to the variable capacitor in parallel;
a first load resistor coupled between the third node and a second power source; and
a second load resistor coupled between the fourth node and the second power source.

9. The receiver of claim 7, wherein each of the plurality of samplers includes:
a fifth transistor having a first terminal coupled to the first power source, a second terminal coupled to a fifth node, and a control terminal receiving the clock signal;
a sixth transistor having a first terminal coupled to the fifth node, a second terminal coupled to a sixth node, and a control terminal receiving the first differential equalization signal;
a seventh transistor having a first terminal coupled to the fifth node, a second terminal coupled to a seventh node, and a control terminal receiving the second differential equalization signal;
an eighth transistor having a first terminal coupled to the sixth node, a second terminal coupled to the seventh node, and a control terminal coupled to a second power source;
a ninth transistor having a first terminal coupled to the sixth node, a second terminal coupled to an eighth node, and a control terminal coupled to a ninth node; and
a tenth transistor having a first terminal coupled to the seventh node, a second terminal coupled to the ninth node, and a control terminal coupled to the eighth node.

10. The receiver of claim 9, wherein each of the plurality of samplers further includes:
an eleventh transistor having a first terminal coupled to the eighth node, a second terminal coupled to the second power source, and a control terminal receiving the clock signal;
a twelfth transistor having a first terminal coupled to the ninth node, a second terminal coupled to the second power source, and a control terminal receiving the clock signal;
a thirteenth transistor having a first terminal coupled to the eight node, a second terminal coupled to the second power source, and a control terminal coupled to the ninth node;
a fourteenth transistor having a first terminal coupled to the ninth node, a second terminal coupled to the second power source, and a control terminal coupled to the eighth node; and
a fifteenth transistor having a first terminal coupled to the eighth node, a second terminal coupled to the ninth node, and a control terminal receiving the clock signal.

11. The receiver of claim 9, wherein each of the plurality of samplers further includes:
a first inverter configured to generate a set signal based on a voltage of the eighth node;
a second inverter configured to generate a reset signal based on a voltage of the ninth node; and
a latch configured to generate an output signal based on the set signal and the reset signal.

* * * * *